United States Patent
Osten et al.

(10) Patent No.: US 7,234,744 B2
(45) Date of Patent: Jun. 26, 2007

(54) ROTATABLE, SQUEEZE-SPREAD END EFFECTOR FOR INDUSTRIAL ROBOT

(75) Inventors: Gabriel F. Osten, St. Croix Falls, WI (US); Mark A. Price, New Richmond, WI (US)

(73) Assignee: Doboy Inc., New Richmond, WI (US)

( * ) Notice: Subject to any disclaimer, the term of this patent is extended or adjusted under 35 U.S.C. 154(b) by 243 days.

(21) Appl. No.: 10/881,230

(22) Filed: Jun. 30, 2004

(65) Prior Publication Data

US 2006/0017298 A1 Jan. 26, 2006

(51) Int. Cl.
*B25J 15/06* (2006.01)
(52) U.S. Cl. .................. 294/65; 294/87.1; 414/737
(58) Field of Classification Search .............. 294/64.1, 294/65, 87.1, 87.12; 414/627, 737, 752.1
See application file for complete search history.

(56) References Cited

U.S. PATENT DOCUMENTS

| | | | | |
|---|---|---|---|---|
| 3,630,389 | A * | 12/1971 | Schmidt et al. ............... | 414/4 |
| 3,860,280 | A * | 1/1975 | Karlsson ..................... | 294/87.1 |
| 4,355,936 | A * | 10/1982 | Thomas et al. ............ | 414/796.2 |
| 4,444,424 | A * | 4/1984 | Lebret ........................ | 294/87.1 |
| 4,571,320 | A * | 2/1986 | Walker ........................ | 264/40.1 |
| 4,744,595 | A | 5/1988 | Tonning et al. | |
| 4,832,180 | A * | 5/1989 | Ferrero ..................... | 198/468.3 |
| 5,149,162 | A * | 9/1992 | Focke et al. ................ | 294/64.1 |
| 5,575,376 | A * | 11/1996 | Colamussi ................ | 198/468.3 |
| 5,735,200 | A * | 4/1998 | Tomei et al. ................ | 100/215 |
| 5,865,487 | A * | 2/1999 | Gore et al. ..................... | 294/2 |
| 6,068,317 | A * | 5/2000 | Park ........................... | 294/87.1 |
| 6,210,093 | B1 * | 4/2001 | Hannen et al. ........... | 414/226.01 |
| 6,374,996 | B1 * | 4/2002 | Hsieh ..................... | 198/750.12 |
| 6,439,631 | B1 * | 8/2002 | Kress ........................... | 294/65 |
| 2003/0235491 | A1 | 12/2003 | Subotincic | |

FOREIGN PATENT DOCUMENTS

| | | |
|---|---|---|
| JP | 06156410 | 3/1994 |
| JP | 06262572 | 9/1995 |

\* cited by examiner

*Primary Examiner*—Dean J. Kramer
(74) *Attorney, Agent, or Firm*—Nikolai & Mersereau, P.A.; Thomas J. Nikolai

(57) ABSTRACT

An end effector (10) for an industrial robot has the ability to pick up plural objects, selectively rotate same and adjusts the spacing between the plural objects as the products are being carried by the robot to a desired deposit location. This functionality is achieved by locating a rotary actuator (16) at the end (8) of a robot arm and providing a lazy tong linkage assembly (60) to which plural product graspers (62) are affixed where the lazy tong assembly is carried by a rotatable platform (18) of the rotary actuator. The rotary actuator, the lazy tong assembly and the product graspers are preferably pneumatically actuated.

11 Claims, 4 Drawing Sheets

ROTATABLE, SQUEEZE-SPREAD END EFFECTOR FOR INDUSTRIAL ROBOT

BACKGROUND OF THE INVENTION

I. Field of the Invention

This invention relates generally to pick-&-place robotics, and more particularly to end effectors used on such equipment.

II. Discussion of the Prior Art

In the packaging industry, many of the tasks that had been carried out manually are now performed by industrial robots. As an example, such robots have been designed to pick up individual products from a first conveyor exiting a high-speed wrapping machine and transporting the wrapped products to a box or carton traveling along a second conveyor. A problem results, however, if the product size and/or shape are such that it can fit into a carton only if oriented precisely in a certain disposition. Then, too, if the robot is to simultaneously pick up a plurality of products from a conveyor, rather than one at a time, and the products are traveling down a flighted conveyor, it presents a problem of how to deposit the products as a group into a carton in a contiguous relationship.

For purposes of example only, assume for the moment that the products leaving the wrapping machine are candy bars of a defined length, width and thickness dimension and that they are traveling between lugs or fins of a flighted conveyor that maintains a predetermined gap between products. Assume further that it is desired to deposit a predetermined count of the candy bars, say, one dozen, in an open top rectangular carton as the carton moves down a second conveyor running parallel to the first. The robot employed must be able to simultaneously pick up plural bars from the flighted conveyor, squeeze the several bars together to eliminate the spacing therebetween and then deposit the plural bars as a group in the carton and then repeat the process until the desired count has been boxed. Depending on the dimensions of the candy bars and the dimension of the carton, it may also be necessary to rotate the group of bars while in transit, via the robot, so that they will be properly aligned for deposit into the box.

It is the principal object of the present invention to provide an improved end effector for an industrial robot for use in pick & place applications.

Another object of the invention is to provide an end effector capable of compressing and expanding the spacing between plural product grasping devices comprising the end effector.

Still another object of the invention is to provide an end effector for a robot having a rotatable head capable of both rotating plural products and expanding and contracting the spacing between the plural products picked up by the end effector as the products are being carried by a robot.

SUMMARY OF THE INVENTION

The foregoing objects are realized by providing an end effector for an arm of an industrial robot that comprises a plurality of suction tubes coupled in fluid communication to a vacuum manifold where each of the suction tubes is capable of grasping a product. The end effector also includes a means for varying the spacing between the plurality of suction tubes as well as a means for rotating the vacuum manifold and the means for varying the spacing between the plurality of suction tubes relative to the arm of the industrial robot carrying the end effector.

Without limitation, the means for varying the spacing between the plurality of suction tubes may comprise a lazy tong linkage assembly that is coupled to a linear actuator such that extension of the linear actuator results in a spreading of the distance between the suction tubes and retraction of the linear actuator results in a squeezing of the plurality of suction tubes together.

The means for rotating the vacuum manifold preferably comprises a pneumatically operated rotary actuator having a rotary platform journaled to a body member where the rotary actuator is disposed between the arm of the industrial robot and the vacuum manifold.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which.

DESCRIPTION OF THE PREFERRED EMBODIMENT

Figure 1:
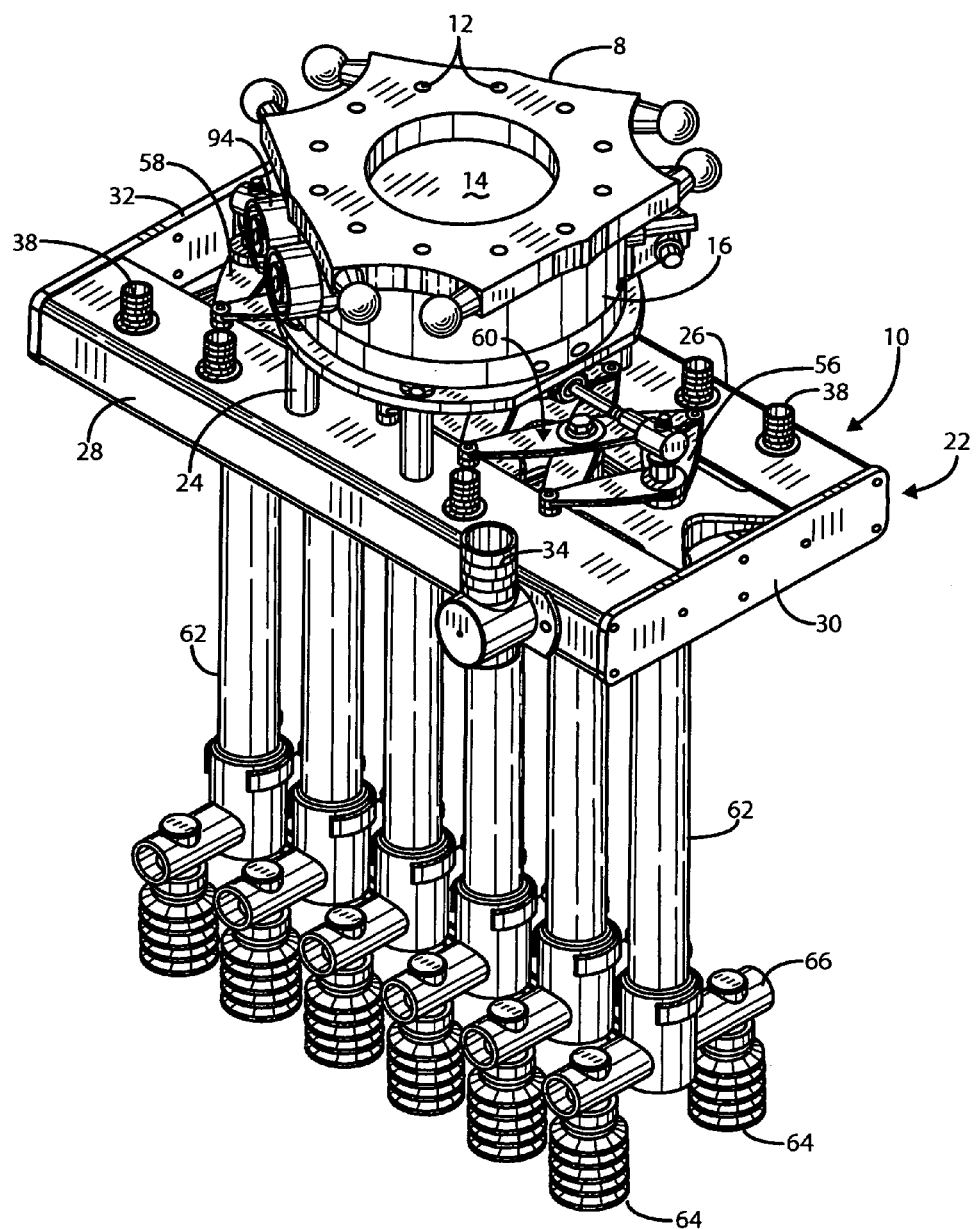
FIG. 1 is a perspective view of a preferred embodiment of an end effector constructed in accordance with the present invention.

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof. Said terminology will include the words above specifically mentioned, derivatives thereof and words of similar import.

Referring first to FIG. 1, there is indicated generally by numeral 10 an end effector for use on an industrial robot such as a Delta Robot of the type described in U.S. Pat. No. 4,976,582 to Raymond Clavel (the Clavel '482 patent). The patent describes a robot for handling products in a three-dimensional space and those skilled in the art may refer to that patent for a description of a robot with which the present invention may be utilized. Such a robot is designed for high-speed and high-accuracy pick-&-place applications, such as may be effectively used in the packaging machine industry, for picking products from a conveyor belt and placing them in cartons or to the infeed of a high-speed wrapping machine with a predetermined orientation and spacing between products.

Figure 2:
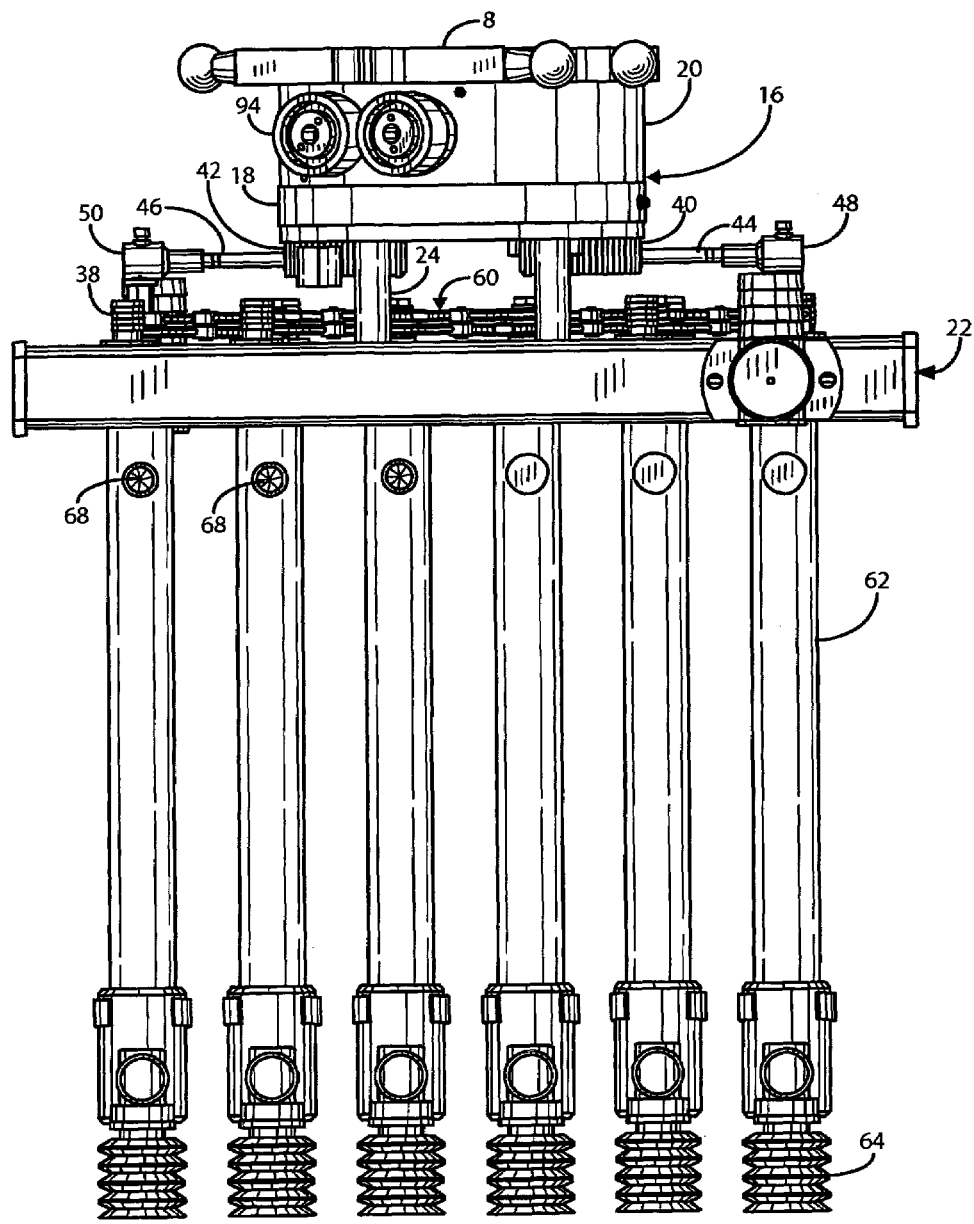
FIG. 2 is a side elevational view of the end effector of FIG. 1.

Referring to FIG. 2 of the Clavel '482 patent, the Delta Robot includes a generally triangular-shaped main casting 1 having three rotatable shafts 2 journaled for rotation about horizontal axes extending generally parallel to the three sides of the triangular casting 1. Each of the three shafts is arranged to be driven by a servo motor 3 for rotating the arms 4 in a vertical plane. Rotary encoders 7 on the servo motor 3 feed positional information to a main controller module 12. At the free ends of the arms 4 are crossbars of a predetermined length dimension and carrying a detachable connector, such as ball & socket joints 26, at a opposed ends thereof. The detachable ball & socket joints 26 couple the cross bars to a pair of rods comprising a total of six forearms 5, all of equal length.

Suspended from the lower ends of the six forearms 5 is a triangular-shaped base plate member 8. More particularly, cross rods project laterally from the base plate 8 proximate the three vertices thereof and detachable connectors, e.g., ball & socket joints 27, are used to join the lower ends of the forearm members 5 to the cross rods. Supported from the underside of the base plate 8 is an end effector 9 which may comprise a vacuum cup or other type of gripping member. In that the forearms 5 are of equal length, as the respective servo motors impart rotation to the arms 4, the base plate 8 carrying the end effector 9 undergoes pure translation without rotation in first swinging to pick up a product located in a first area and transporting it to a second area for release.

In FIG. 1 hereof, the base plate 8 of the Delta Robot is shown with the end effector 10 of the present invention attached to the undersurface thereof by a series of bolts, as at 12, which extend into threaded bores formed in the top surface 14 of a rotary actuator 16. Without limitation, the rotary actuator 16 may be of a type manufactured and sold by Numatics Incorporated of Highland, Mich. As will be explained in greater detail herein below with the aid of FIG. 4, the rotary actuator 16 includes a rotary platform 18 (FIG. 2) journaled to a body member 20 where the body member 20 is affixed to the underside of the base plate 8 of the Delta Robot. Under pneumatic forces, the rotary platform 18 can be made to swivel through a predetermined arc.

The rotary actuator 16 is mounted on a frame structure that is indicated generally by numeral 22 in FIG. 1. More particularly, a series of standoffs as at 24, secure the rotary actuator 16 to the frame 22 so as to maintain a predetermined distance between the underside of the rotary platform 18 and the upper surface of the frame 22.

The frame 22 comprises first and second tubular vacuum manifolds 26 and 28 that are held in parallel, spaced-apart relationship by opposed end plates 30 and 32. As can be seen in FIG. 1, the tubular manifold 28 has a vacuum inlet port 34 adapted to be connected by flexible tubing, not shown, to a vacuum source. The tubular manifold member 26 also has a vacuum inlet port 36 that is hidden from view in FIG. 1, but visible in the end view of FIG. 3. A vacuum can be selectively applied to one or both manifolds. Each of the manifold members 26 and 28 has a plurality of vacuum outlet ports, as at 38.

As perhaps best seen in FIG. 2, bolted to the underside of the rotary platform 18 are first and second linear actuators 40 and 42. Each comprises a pneumatic 2-way cylinder whose reciprocally movable outlet shafts 44 and 46 terminate in fittings 48 and 50. These fittings are pivotally connected by a pin 52 that passes through a standoff 54 to end linkages 56 and 58 of a lazy tong linkage assembly that is indicated generally by numeral 60. The lazy tong linkage assembly 60 comprises a plurality of pairs of diagonal linkages, where the members of each pair are pivotally joined at their centers and are also pivotally joined to an adjacent pair of diagonal linkages at their respective ends, as perhaps best seen in the perspective view of FIG. 1.

Turning momentarily to FIG. 2, attached to the lazy tong assembly 60 proximate the center of the diagonal linkages thereof are product graspers, here shown as downwardly extending rigid tubes, as at 62, each supporting a pair of suction cups, as at 64, that are in fluid communication with the central lumen of the rigid tubes 62 by way of tubular stubs, as at 66. While the illustrated embodiment uses pneumatic graspers, it is to be understood that other mechanical or electrically operated graspers may also be used.

Figure 3:
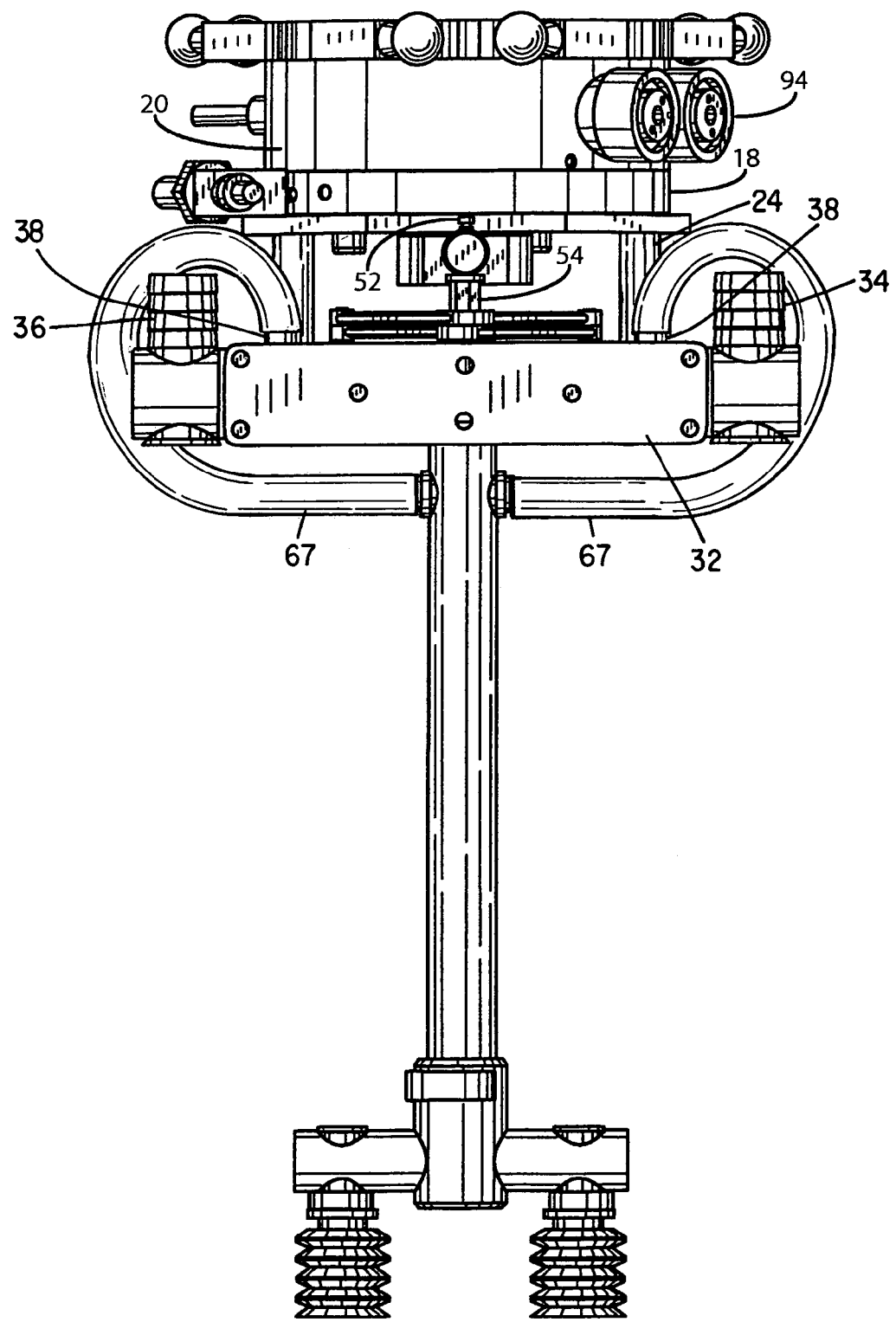
FIG. 3 is an end view of the embodiment of FIG. 1.

Short lengths of flexible plastic tubing as at 67 in FIG. 3 are used to connect the manifold outlet ports 38 to corresponding input ports 68 near the upper ends of the rigid tubes 62. Thus, when a vacuum source is connected to the manifolds 26 and 28 by way of the vacuum inlet ports 34 thereof, suction forces are developed proximate the lower ends of all of the suction cups 64. If a vacuum is applied to only one of the manifolds, only those suction cups associated with that manifold will be active to grasp a product.

Figure 4:
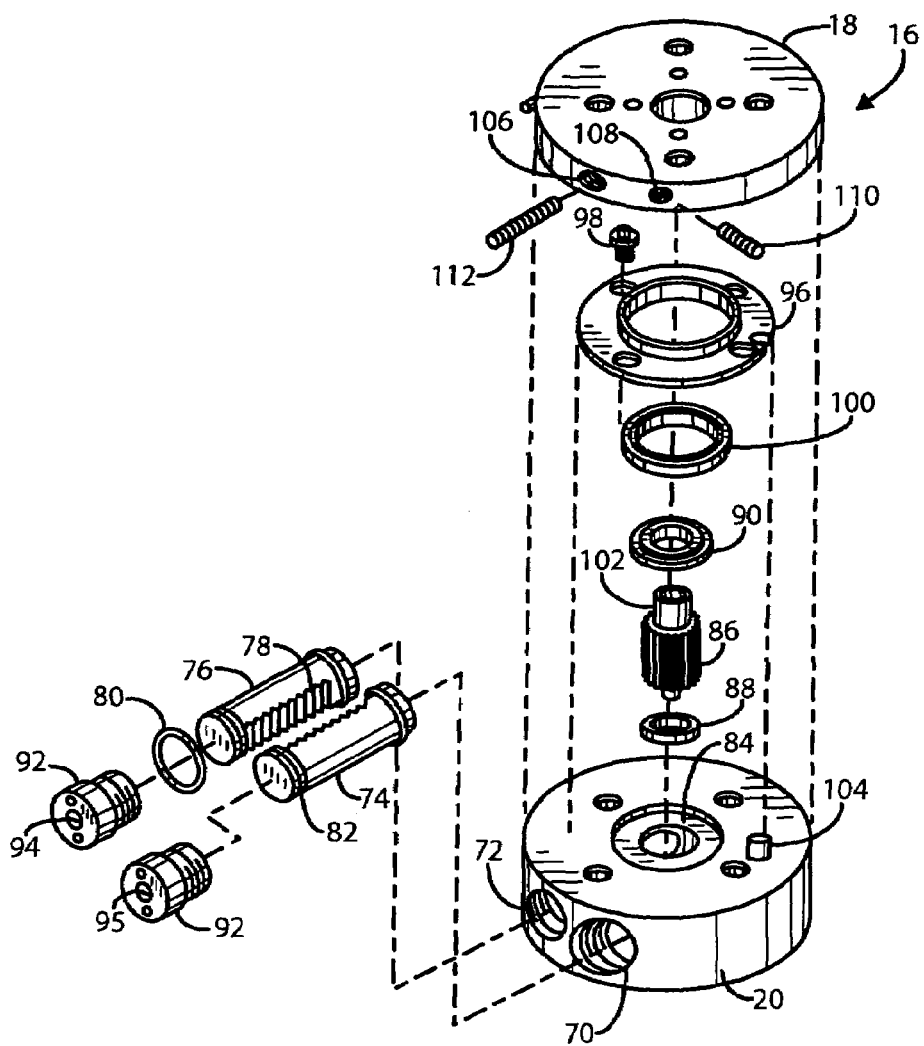
FIG. 4 is an exploded view of a rotary actuator employed in the embodiment of FIG. 1.

Turning now to FIG. 4, the constructional features of the rotary actuator 16 will be described. The body member 20 thereof includes a pair of bores 70 and 72 that receive generally cylindrical pneumatic pistons 74 and 76 therein. The piston members include a gear rack 78 machined into a flattened portion of the periphery of the otherwise cylindrical pistons. O-rings, as at 80, fit into circumferential grooves 82 formed proximate the opposed ends of the pistons and serve as seals between the pistons and the walls of the bores in which they reside.

The body member 20 includes a centrally located vertical cylindrical bore 84 for receiving a pinion gear 86 and bearings 88 and 90 therein. The gear teeth on the pinion 86 are arranged to mate with the gear rack 78 on the pistons 74 and 76 such that when the pistons are made to move reciprocally in the bores 70 and 72, the pinion gear 86 will rotate about its central axis.

Once the pistons 74 and 76 have been inserted into the respective bores 70 and 72, tubular caps as at 92 are screwed into threads formed the bores 70 and 72 of the body member 20. Thus, when air, under pressure, is introduced through the central bore 94 of the end caps 92, the pistons can be made to move toward the center of the body member 20, rotating the spur gear 86 in a first direction. With a pressure applied through the bore 95, the alternate pistons will be forced toward the periphery of the body member 20 causing the pinion gear 86 to rotate in the opposite direction.

A retainer ring 96 is fastened by screws 98 to the surface face of the body member 20 holding the bearings 88, 90 and 100 that journal the pinion gear 86 in place.

The rotary platform 18 is secured to an upwardly projecting shaft 102 of the pinion gear 86 so as to rotate with the pinion gear. Formed in the undersurface of the rotary platform 18 is an annular groove (not shown) into which a projection 104 on the body member 20 is arranged to fit. Threaded bores 106 and 108 extend radially into the peripheral surface of the rotary platform 18 and intersect with the annular groove. Setscrews 110 and 112 are inserted into the threaded bores 106 and 108 to cooperate with the stop 104 to define the end points of the arc through which the rotary platform 18 may rotate.

Having described the construction features of the preferred embodiment, attention will now be directed to the mode of operation.

With the rotary actuator 16 affixed to the robot's base plate 8 at the lower ends of the robot's arms and with pressure hoses (not shown) connected to the end caps 94 of the rotary actuator and with a source of negative pressure connected through tubing (not shown) to the manifold inlet ports 34 and 36, a suction can be drawn through the suction cups 64 to grip and hold a plurality of products at the lower ends of the rigid tubes 62. With valving (not shown), the linear actuators 40 and 42 can have their piston rods 44 and 46 extended or retracted, thereby varying the spacing between the plurality of rigid tubes and the products carried thereby by virtue of the lazy tong linkage mechanism that is operatively coupled to the reciprocally movable piston rods 44 and 46.

At the same time, by controlling the air pressure acting on the pistons 74 and 76, the rotary platform 18 can be made to spin through a predetermined arc as set by the adjustment screws 110 and 112 to thereby rotate the frame 22, the lazy tong assembly 60 and the rigid tubes 62 relative to the base plate 8 of the robot arm with which the end effector 10 of the present invention is used.

As has been explained in the Background of the Invention section hereof, a plurality of objects may simultaneously be picked up from a conveyor belt for placement in a carton traveling along an adjacent conveyor belt. The spacing between the objects can be varied in transit. Likewise, all of the objects can be rotated through a present arc while the objects are in transit under control of the robot arm from a "pick" position to a "place" position.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. An end effector for an arm of an industrial robot comprising:
    (a) a plurality of suction tubes coupled in fluid communication to a vacuum manifold;
    (b) means for varying the spacing between the plurality of suction tubes; and
    (c) a rotary actuator for rotating the vacuum manifold and the means for varying the spacing between the plurality of suction tubes on a vertical axis through a preset arc between two fixed positions, said rotary actuator comprising pneumatically-operated rack gears engaging a pinion on a rotary platform journaled to a body member, the vacuum manifold being attached to one of said rotary platform and said body member.

2. The end effector of claim 1 wherein the vacuum manifold includes a pair of vacuum manifold members held in parallel, spaced-apart relationship and each having an inlet port adapted to be selectively coupled to a vacuum source and a plurality of outlet ports, the outlet ports of the manifold members being coupled by flexible tubing to vacuum inlet ports on the plurality of suction tubes.

3. The end effector as in claim 1 wherein the means for varying the spacing between the plurality of suction tubes comprises a lazy tong linkage assembly from which the plurality of suction tubes are suspended.

4. The end effector of claim 3 and further including a linear actuator operatively coupled between the lazy tong linkage assembly and the one of said rotary platform and said body member to which the vacuum manifold is attached.

5. The end effector as in claim 4 wherein the linear actuator is pneumatically operated.

6. The end effector as in any one of claims 1-3 or 4-5 and further including at least one elastomeric suction cup coupled to a distal end of each of the plurality of suction tubes.

7. An end effector for an industrial robot, comprising:
    (a) a rotary actuator having a rotary platform journaled to a body member, one of said rotary platform and body member being affixed in a horizontal disposition to an arm of an industrial robot;
    (b) a manifold member affixed to the other of said rotary platform and body member, the manifold member being rotatable about a vertical axis and between a predetermined pick position and a predetermined place position determined by said rotary actuator and having a vacuum inlet port and a plurality of vacuum outlet ports;
    (c) a lazy tong linkage mechanism;
    (d) a plurality of rigid tubes affixed to the lazy tong linkage mechanism, each of said rigid tubes supporting a suction cup proximate a distal end thereof and having a vacuum inlet port in fluid communication with one of the plurality of vacuum outlet ports of the manifold member; and
    (e) a fluid actuator coupled between the other of said rotary platform and body member and the lazy tong linkage mechanism for varying the spacing between the plurality of rigid tubes.

8. The end effector as in claim 7 wherein the lazy tong linkage mechanism comprises a plurality of pairs of diagonal linkages, the members of each pair being pivotally joined at their centers and to an adjacent pair of diagonal linkages at their ends, one of the plurality of rigid tubes being affixed to the pivot joining the diagonal linkage members at their centers.

9. An end effector for an arm of an industrial robot, comprising:
    (a) a rotary actuator adapted to be connected to the arm of the industrial robot, the rotary actuator having a rotary platform member jounaled to a body member and rotatable about a vertical axis through an arc between a fixed pick position and a fixed place position;
    (b) a lazy tong linkage assembly suspended from the rotary platform;
    (c) a plurality of product grasping elements joined to the lazy tong linkage assembly;
    (d) an actuator coupled to the lazy tong linkage assembly for selectively varying the spacing between the plurality of product grasping elements and
    (e) said rotary actuator including power-operated rack nears engaging a pinion on the rotary platform jounaled to the body member such that displacement of the rack gears rotates said platform.

10. The end effector as in claim 9 wherein the product grasping elements comprise pneumatic suction tubes.

11. The end effector as in claim 10 wherein the actuator coupled to the lazy tong linkage assembly and the rotary actuator are pneumatically operated.

* * * * *

UNITED STATES PATENT AND TRADEMARK OFFICE
CERTIFICATE OF CORRECTION

PATENT NO. : 7,234,744 B2
APPLICATION NO. : 10/881230
DATED : June 26, 2007
INVENTOR(S) : Gabriel F. Osten and Mark A. Price It is certified that error appears in the above-identified patent and that said Letters Patent is hereby corrected as shown below:

Column 6, line 50, change "nears" to -- gears --.

Signed and Sealed this

Seventh Day of August, 2007

JON W. DUDAS
*Director of the United States Patent and Trademark Office*